United States Patent [19]
Dorr

[11] Patent Number: 5,408,695
[45] Date of Patent: Apr. 18, 1995

[54] INTELLIGENT AUTOMATIC DEVIATION COMPENSATION FOR WIRELESS MODEMS

[75] Inventor: Barry L. Dorr, Encinitas, Calif.

[73] Assignee: Coded Communications Corporation, Carlsbad, Calif.

[21] Appl. No.: 999,308

[22] Filed: Dec. 31, 1992

[51] Int. Cl.$^6$ ............... H04B 17/00; H04L 27/08
[52] U.S. Cl. .............. 455/226.1; 455/67.1; 455/70; 455/234.1; 455/245.1; 375/223; 375/345
[58] Field of Search ............ 455/226.1, 226.4, 67.1, 455/70, 71, 234.1, 234.2, 245.1, 250.1, 254, 240.1; 375/8, 9, 98

[56] References Cited

U.S. PATENT DOCUMENTS

| | | |
|---|---|---|
| 3,195,047 | 7/1965 | Ruthroff. |
| 4,222,118 | 9/1980 | Dickinson et al. . |
| 4,541,118 | 9/1985 | Eastmond et al. . |
| 4,768,204 | 8/1988 | Zeiss . |
| 4,890,332 | 12/1989 | Takahashi . |
| 4,910,791 | 3/1990 | Dickinson et al. . |
| 5,040,194 | 8/1991 | Tjahjadi et al. ............ 375/98 |
| 5,050,192 | 9/1991 | Nawata ............ 455/245.1 |
| 5,052,024 | 9/1991 | Moran, III et al. . |
| 5,109,532 | 4/1992 | Petrovic et al. . |

Primary Examiner—Curtis Kuntz
Assistant Examiner—Thanh Le
Attorney, Agent, or Firm—Dennis H. Epperson

[57] ABSTRACT

An apparatus automatically determines the frequency deviation of a transmitter by analyzing a signal received from the transmitter. The apparatus automatically corrects the incoming signal for the improper deviation and maintains a record of the frequency deviation errors. Transmitters which consistently exhibit errors may then be recalled for servicing. This device increases data transmission reliability, improves compliance with FCC licensing regulations and reduces maintenance costs.

11 Claims, 7 Drawing Sheets

BLOCK DIAGRAM, ADC CARD

INTELLIGENT AUTOMATIC DEVIATION COMPENSATION FOR WIRELESS MODEMS

FIELD OF THE INVENTION

This invention relates to wireless data communications systems, specifically to those systems where a large number of remote frequency modulated transceivers are accessing a single base station transceiver and digital data is transmitted therebetween.

BACKGROUND OF THE INVENTION

The invention generally relates to the field of wireless data networks having several remote transceivers which share access to a centrally located base station transceiver. The base station is preferably located such that the signal path between it and the mobile units is minimally obstructed. Since the optimal location for the base station is often a remote location like a mountaintop, tall building or tower, it may be linked to a central office or dispatch center at another location by dedicated telephone lines. Such communication systems are typically used by public service agencies (police, fire, ambulance, etc.), as well as private businesses (taxicabs, couriers, utilities, etc.).

While wireless communication systems have been in use for many years, the demand for systems which improve upon the speed and reliability of digital data transmission from mobile units has greatly increased in recent years. This is due to the rapid implementation of data processing systems, i.e., computers, into virtually all types of systems, made possible, in part, by the decrease in size and power requirements for portable computers. Thus, it is now commonplace to find computers in mobile and handheld packages. Mobile data users find it particularly advantageous to link their data processing systems with other remote data processing systems without having to plug into a hardwired system such as the telephone network. For example, wireless linkages among mobile computer systems has widely expanded the utility of portable data processing in computer aided dispatch systems, automatic vehicle location systems and other applications where it is desirable to have a wireless connection for data transfer between mobile data terminals, mobile computer terminals, laptop computers, etc. A few specific examples include: 1) Automatic Number Identification (ANI) systems which enable public safety officers, taxi drivers and other mobile and portable radio users to identify themselves automatically and digitally with every radio transmission, thereby increasing security and management control; 2) automatic vehicle location (AVL) systems utilizing Global Positioning Systems (GPS) provide very accurate realtime positional information for each mobile unit of a fleet, a feature proving to be extremely valuable in total fleet management and Computer-Aided Dispatch (CAD) of mobile fleets; 3) digital messaging; and 4) access to large computer systems from remote locations for data entry and retrieval.

Since many users and potential users of these mobile data communications systems already have a large installed base of voice grade mobile communications systems, it is desirable and efficient to utilize the voice equipment for transmission of digital information in addition to voice. This is achieved by converting the data waveform to an audio waveform and passing it through the radio system in the same manner as voice is passed. Specifically, many mobile data communication systems use Frequency Modulation (FM) transmission techniques.

In a frequency modulation system, the signal to be transmitted modulates an RF carrier, thus converting the signal to be transmitted into a frequency deviation about a center frequency of an FM channel. The degree or amplitude of this frequency deviation must be calibrated and adjusted in each mobile unit. A common practical problem with FM mobile transceivers is that they are often installed by personnel who are not trained to test and/or adjust frequency deviation. Additionally, the deviation often tends to drift with time. If the deviation is improperly adjusted, the unit will behave somewhat erratically. The user of the mobile unit may not notice the poor performance in voice operation and has no way of detecting it when transmitting data. Thus, diagnosis and repair of improperly deviating transceivers is often time consuming and tricky. Additionally, when an improperly deviating unit is taken out of field service and tested in a repair facility, the degradation due to improper deviation may not be severe enough to cause the unit to fail. Diagnosis and correction of the problem requires a trained technician with specialized test equipment.

Deviation is also important from a regulatory point of view. Most every communication system which propagates signals through the air is provided a license by the Federal Communications Commission (F.C.C.) or some other governing body. Normally, part of the license specifies the amount of bandwidth which the licensed system is allowed to occupy as well as a maximum peak deviation. (See the F.C.C Code of Federal Regulations-Part 90.209) Since the occupied bandwidth of an FM signal increases with increasing deviation, excessive deviation can cause the licensed system to violate the terms of its license.

When a mobile modem is connected to a mobile radio, deviation of the audio signal is often set improperly. This happens because the modem is often used as a "bolt-on" accessory for existing radios, and must provide a wide range of adjustment. If the deviation is set too low, the result is a reduction in discriminator signal to noise ratio and a reduction in discriminator level. If deviation is set too high, the discriminator output becomes excessively large and often non-linear. Another result, as mentioned previously, is that the signal can exceed the legally allocated bandwidth of the system.

Improperly set deviation is logistically difficult and expensive to detect. When the normal system deviation for a system should be set at point A as shown in FIG. 3, the result of improper deviation is a reduction in signal to noise ratio which reduces the reliability of the data system. If the same driver uses the vehicle every day, he may never realize that his modem is not working as well as it should. Another problem often occurs if the driver notices that there is a problem and takes the vehicle into a repair facility. If the repair facility is closer to the base station than the driver's normal route, then the modem may work properly when tested and the technician may incorrectly conclude that the problem is operator error and makes no measurements or adjustments.

Many of the problems associated with wireless transmission of data utilizing voice quality FM transceivers could be reduced if frequency deviation errors could be detected and remedied in a timely manner. The present invention provides a means for both measuring deviation of the mobile units and correcting the output level of the base discriminator so that the base modem can decode the signal. The system also maintains a historical data base so that vehicles which present continuous deviation errors are automatically identified. Hence, the problem of detecting incorrect deviation is greatly mitigated.

SUMMARY OF THE INVENTION

The present invention is directed to an apparatus and method for monitoring the frequency deviation of a transceiver which is transmitting data to a receiving transceiver. The present invention comprises an automatic deviation control circuit which measures the deviation of an incoming data signal and corrects the incoming data signal for deviation errors. This is done by adjusting a variable gain element which outputs a corrected data signal. Thus, when the corrected data signal is presented to a modem, it can be properly decoded, notwithstanding the deviation error in the incoming data signal. Additionally, a historical data base of the transmitting station's deviation is maintained to monitor its deviation adjustment. If the unit consistently transmits with deviation errors, it can be recalled for repair and adjustment. Hence, data transmission errors associated with incorrect deviation are greatly mitigated.

The present invention quickly detects, estimates and compensates transmitter deviation error on incoming data signals. A historical data base is maintained which allows an operator to observe the historical deviation performance of each transmitting unit in the system. These features advantageously provide a means for efficient identification of mobile units which are deviating incorrectly. Additionally, the system is also able to effectively salvage many data messages which arrive with incorrect deviation. This results is lower maintenance costs and greater system throughput as well as early identification and repair of mobile units which are violating regulatory requirements by deviating excessively.

One embodiment of the invention is an automatic frequency deviation control system having a receiver for receiving an incoming angle modulated data signal, where the data signal comprises a preamble portion having known characteristics followed by a data portion; and a feedback loop further comprising a signal analyzer for determining the frequency deviation of the incoming angle modulated data signal by comparing the preamble portion of the signal to a reference standard; the signal analyzer further generating a correction signal in response to the comparison; wherein the feedback loop applies the correction signal to the data signal to correct the incoming angle modulated data signal for frequency deviation errors.

The automatic frequency deviation control system may further comprise a memory for storing the correction signal. In alternate embodiments, the receiver further comprises a frequency modulated receiver and the incoming angle modulated data signal is frequency modulated. Alternatively, the incoming angle modulated data signal is phase modulated.

Additionally, the automatic frequency deviation control system receiver further converts the incoming angle modulated data signal into a corresponding audio waveform data signal and the feedback loop further comprises: an amplitude detector for measuring the peak to peak amplitude of the preamble portion of the audio waveform data signal; a comparator for comparing the measured peak to peak amplitude of the preamble portion of the audio waveform data signal to a reference value and generating a deviation correction factor which reflects differences between the measured value and the reference value; and a variable gain element which uses the deviation correction factor to adjust the peak to peak amplitude of the preamble portion of the audio waveform data signal until the measured peak to peak amplitude is substantially equal to the reference value. In another embodiment, the automatic frequency deviation control system further comprises a modem, wherein the modem comprises a controller which: (a) senses the presence of the preamble portion of the audio waveform data signal and enables the feedback loop when the presence of the preamble portion is initially sensed; (b) controls the digitization and storage of the deviation factor which causes the adjusted peak to peak amplitude of the preamble portion of the audio waveform data signal to be substantially equal to the reference value; and (c) appends the digitized deviation factor to the data portion of the audio waveform data signal.

Another embodiment of the invention is a frequency deviation monitor comprising: an automatic gain control circuit, the automatic gain control circuit further comprising: a variable gain element having a signal input, a signal output and a gain control input, wherein: (a) the signal input receives an input signal having a first portion and a second portion, the first portion characterized by a first peak to peak amplitude; (b) the gain control input receives a gain factor; and (c) the signal output delivers a deviation corrected output signal characterized by a second peak to peak amplitude which is a function of the first peak to peak amplitude and the gain factor; an amplitude detector for measuring the second peak to peak amplitude; a comparison element for comparing the second peak to peak amplitude to a reference value, the comparison element having an output indicative of the real time difference between the second peak to peak amplitude and the reference value; a signal averager for producing a deviation correction factor which is proportional to the time average of the real time difference; and a storage element for holding the deviation correction factor, wherein the storage element makes the deviation correction factor available to the variable gain element gain control input and to an analog to digital converter; and a modem for decoding the deviation corrected output signal and controlling the automatic gain control circuit wherein the modem: (a) enables the automatic gain control circuit only when it detects the presence of the first portion of the input signal; (b) sends a begin conversion command to the analog to digital convertor causing it to digitize the deviation correction factor; (c) decodes the deviation corrected output signal to create a decoded message; and (d) appends the deviation correction factor to the decoded message.

The invention may also be embodied as a data modem comprising: a translation circuit for converting an audio data message into an electronic data message; an input analyzer for detecting a predetermined signal characteristic in the audio data message; a first control output which activates a control output signal line when the modem detects the predetermined signal characteristic; and a second control output which provides a begin conversion signal for an analog to digital converter. This embodiment may further comprise an input connection for receiving digitized data from the analog to digital converter.

In yet another embodiment, the invention is a frequency deviation monitor comprising: an input connection for receiving an angle modulated signal, wherein a portion of the angle modulated signal is deterministic in character; a discriminator which converts the angle modulated signal into a corresponding audio waveform signal; and an automatic gain control feedback loop for determining the frequency deviation of the angle modulated signal by comparing the deterministic portion of the corresponding audio waveform signal to a reference standard. In this embodiment, the automatic gain control feedback loop may further comprise a variable gain element having a signal input, a signal output and a gain control input, wherein: (a) the signal input receives the audio waveform signal and the deterministic portion of the signal is characterized by a first peak to peak amplitude; (b) the gain control input receives a gain factor; and (c) the signal output delivers a deviation corrected output signal characterized by a second peak to peak amplitude which is a function of the first peak to peak amplitude and the gain factor. This embodiment may further include an amplitude detector for measuring the second peak to peak amplitude. This embodiment may further include a comparison element for comparing the second peak to peak amplitude to a reference value, the comparison element having an output indicative of the real time difference between the second peak to peak amplitude and the reference value. Additionally, this embodiment may include a signal averager for producing a deviation correction factor which is the time average of the real time difference. Furthermore, this embodiment may incorporate a storage element for holding the deviation correction factor, wherein the storage element makes the deviation correction factor available to the variable gain element gain control input and to an analog to digital converter. In another version of this embodiment is included, a modem for decoding the deviation corrected output signal and controlling the automatic gain control feedback loop wherein the modem: (a) enables the automatic gain control feedback loop only when it detects the presence of the deterministic portion of the audio waveform signal; (b) sends a begin conversion command to the analog to digital convertor causing it to digitize the deviation correction factor; (c) decodes the deviation corrected output signal to create a decoded message; and (d) appends the deviation correction factor to the decoded message.

The present invention further includes a method for monitoring frequency deviation comprising the steps of: receiving an angle modulated signal having a preamble of known characteristics followed by a data message; converting the angle modulated signal to a corresponding audio waveform signal; measuring the peak to peak amplitude of the preamble of the audio waveform signal; processing the audio waveform signal in a feedback loop by adjusting the gain of a variable gain element in the loop until the peak to peak amplitude of the preamble is substantially equal to a reference value; and storing the value of the gain which causes the peak to peak amplitude of the preamble to be substantially equal to the reference value as a deviation correction factor. The method may further include the step of sending the processed audio waveform signal wherein the peak to peak amplitude of the preamble is substantially equal to the reference value to a modem. Additionally, the method may include the step of appending the deviation correction factor to the data message. In yet another embodiment, the method includes the step of transmitting the data message to a data processor. A further embodiment of the method also includes the step of maintaining a historical log of the deviation correction factors for data messages received by the data processor. In the method, the angle modulated signal may further comprise a frequency modulated signal or a phase modulated signal.

These and other characteristics of the present invention will become apparent through reference to the following detailed description of the preferred embodiment and accompanying drawings.

DETAILED DESCRIPTION OF THE PREFERRED EMBODIMENTS

Figure 1:
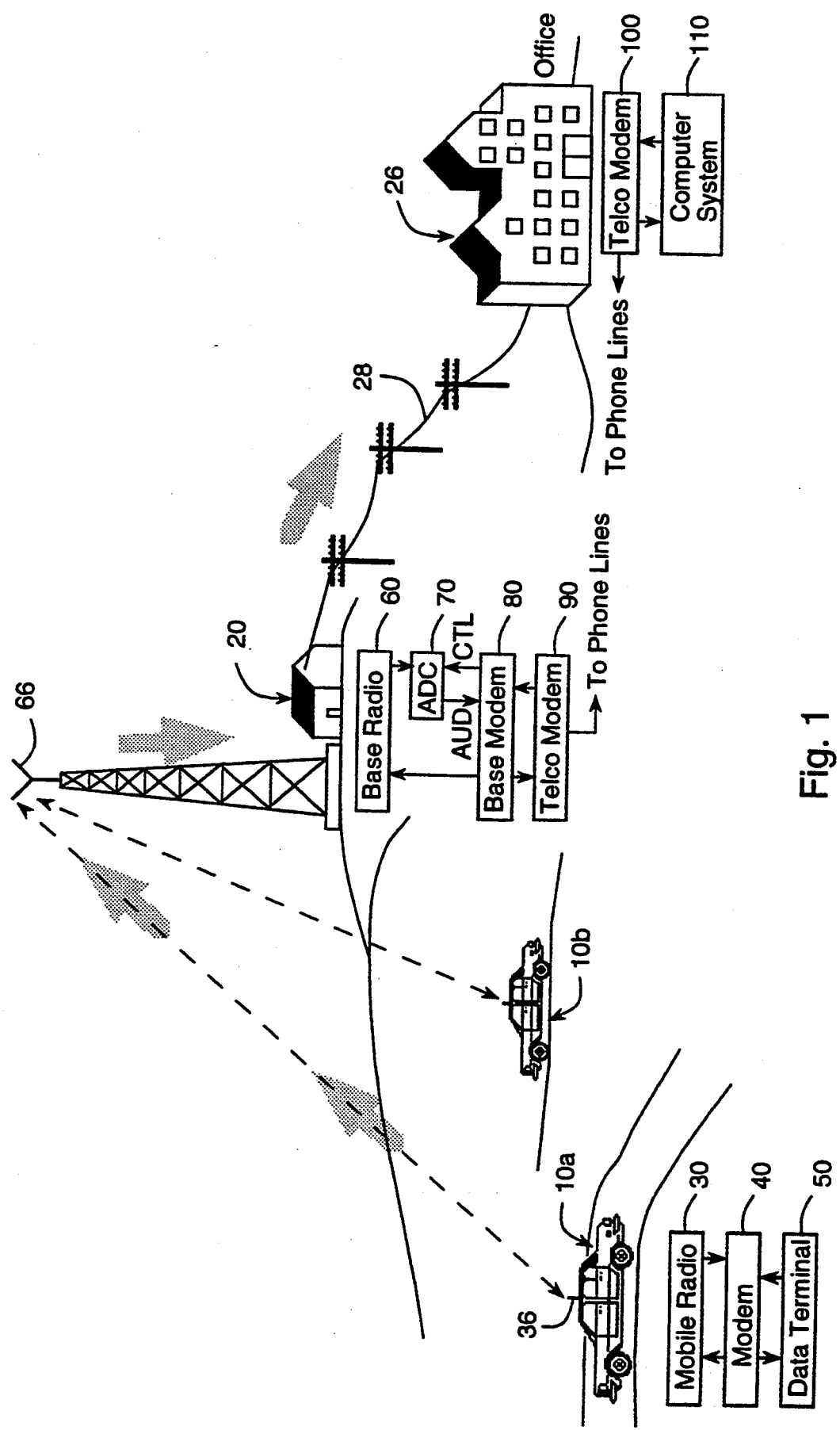
FIG. 1 is a pictorial view of a wireless mobile data communications system incorporating the present invention.
Figure 5:
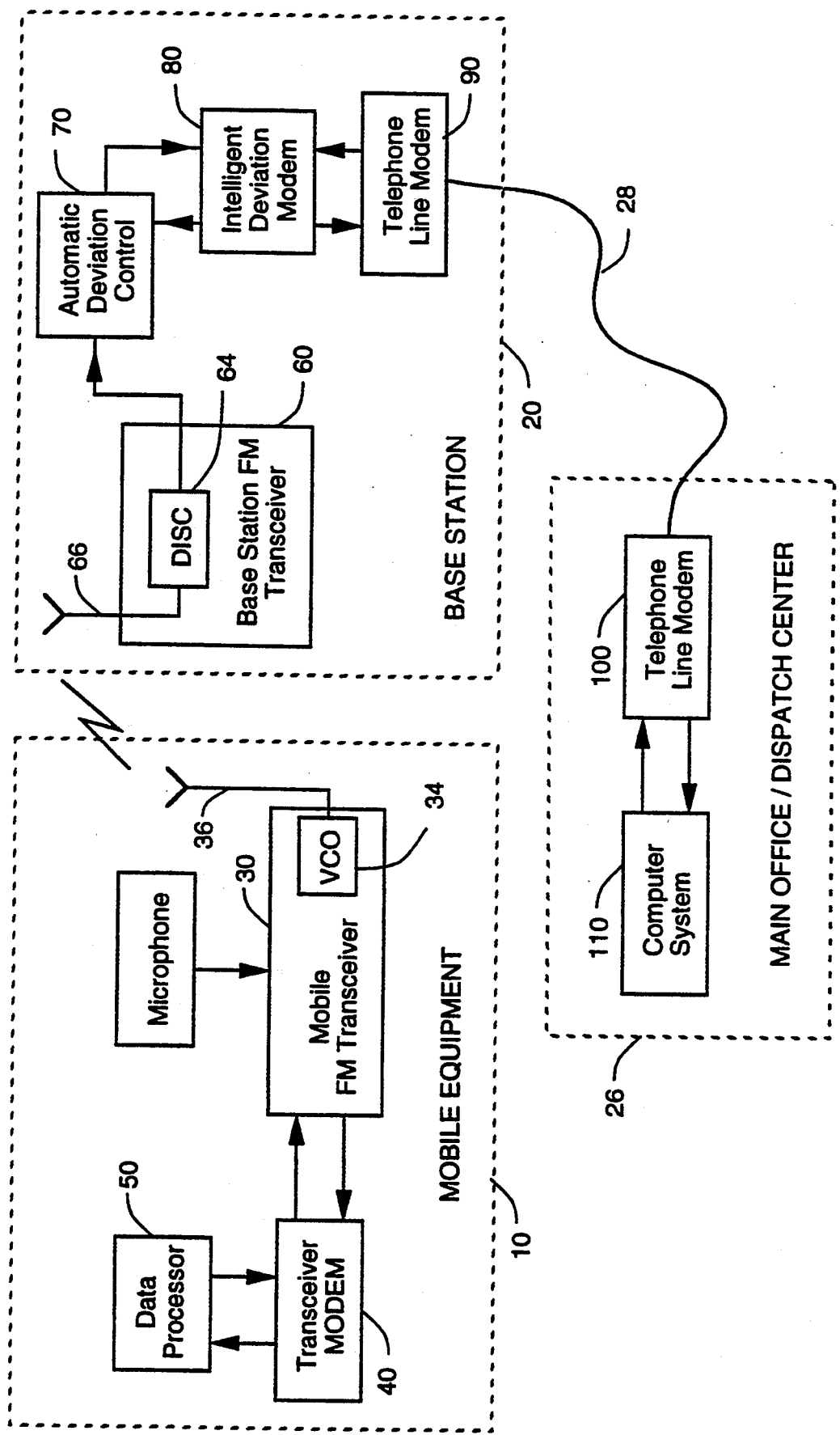
FIG. 5 is a block diagram of a wireless data communications system incorporating the present invention.

FIGS. 1 and 5 show a pictorial view and a block diagram, respectively, of a wireless data communications system having one or more mobile units 10 which communicate with a centrally located base station 20. In many configurations, the base station 20 is linked to a main office or dispatch center 26 via telephone lines 28. Each mobile unit 10 comprises a mobile frequency modulated (hereinafter "FM") transceiver or radio 30, a modem 40 and a data terminal/processor 50. The transceiver 30 further comprises a transmitter section having a voltage controlled oscillator (hereinafter "VCO") 34 and an antenna 36. The base station 20 comprises an FM transceiver 60, an automatic deviation control circuit 70, an intelligent deviation modem 80 and a telephone line modem 90. The base station transceiver 60 further comprises a receiver section having a discriminator 64 and an antenna 66. Dispatch center 26 comprises a telephone line modem 100 and a computer 110. Preferably, the base station transceiver 60 is located such that the paths between it and the mobiles are minimally obstructed.

The data terminal 50 of any mobile unit 10 may generate a data message which is transmitted to that unit's modem 40. The modem 40 translates the data message from an electronic digital message into an audio-digital message signal. One such modem which may used for this purpose is the IQmodem ®, commercially available from Coded Communications, Corporation in Carlsbad, Calif. The audio-digital message signal is then transmitted by the mobile FM transceiver 30 to the base station FM transceiver 60. The mobile FM transceiver 30 and the base station FM transceiver 60 may be any of a variety of commercially available FM communications systems available worldwide from numerous manufacturers. The automatic deviation control circuit 70 adjusts the signal level of the received audio-digital message signal and passes the adjusted audio-digital message signal to the intelligent deviation modem 80 where the audio-digital message signal is translated back to an electronic digital signal using conventional telephone line modem technology, the electronic digital signal is then transmitted via telephone line modems 90 and 100 and telephone line 28 to the main office/dispatch center 26 into the dispatch center computer 110.

In these types of frequency modulated FM communications systems, a modulator in the transmitter section of the transceiver generates a constant amplitude sinusoidal waveform with an instantaneous frequency, $f_o$, which is removed from a center frequency, $f_c$, by an amount proportional to an instantaneous modulation voltage, $V_{in}$. This frequency modulated signal, $f_o$, is amplified and transmitted via an antenna after which it is received by the antenna of another unit having a receiver section. Mathematically, the modulation process can be described as:

$$f_o = f_c + k_1 * V_{in} \quad (1)$$

where:

$f_o$ is the instantaneous output frequency of the transmitter;

$f_c$ is the center frequency of the transmitter;

$k_1$ is a proportionality constant; and $V_{in}$ is the instantaneous modulation voltage.

At the FM receiver, the signal is extracted by reversing the signal voltage to frequency conversion process. A discriminator in the receiver section converts the instantaneous difference between the frequency of the incoming signal, $f_o$, and the center frequency, $f_c$, to an output voltage signal, $V_o$, which is correlated with the modulation voltage $V_{in}$. Mathematically, the demodulation process can be described as:

$$V_o = k_2 * (f_o - f_c) \quad (2)$$

where:

$V_o$ is the instantaneous output voltage from the discriminator;

$k_2$ is a constant of proportionality;

$f_o$ is the instantaneous frequency of the received signal; and $f_c$ is the center frequency.

The deviation of a frequency modulated system is defined to be equal to the maximum amount by which the modulator's instantaneous frequency differs from the center frequency. Note that deviation is proportional to constant $k_1$ above.

Figure 2:
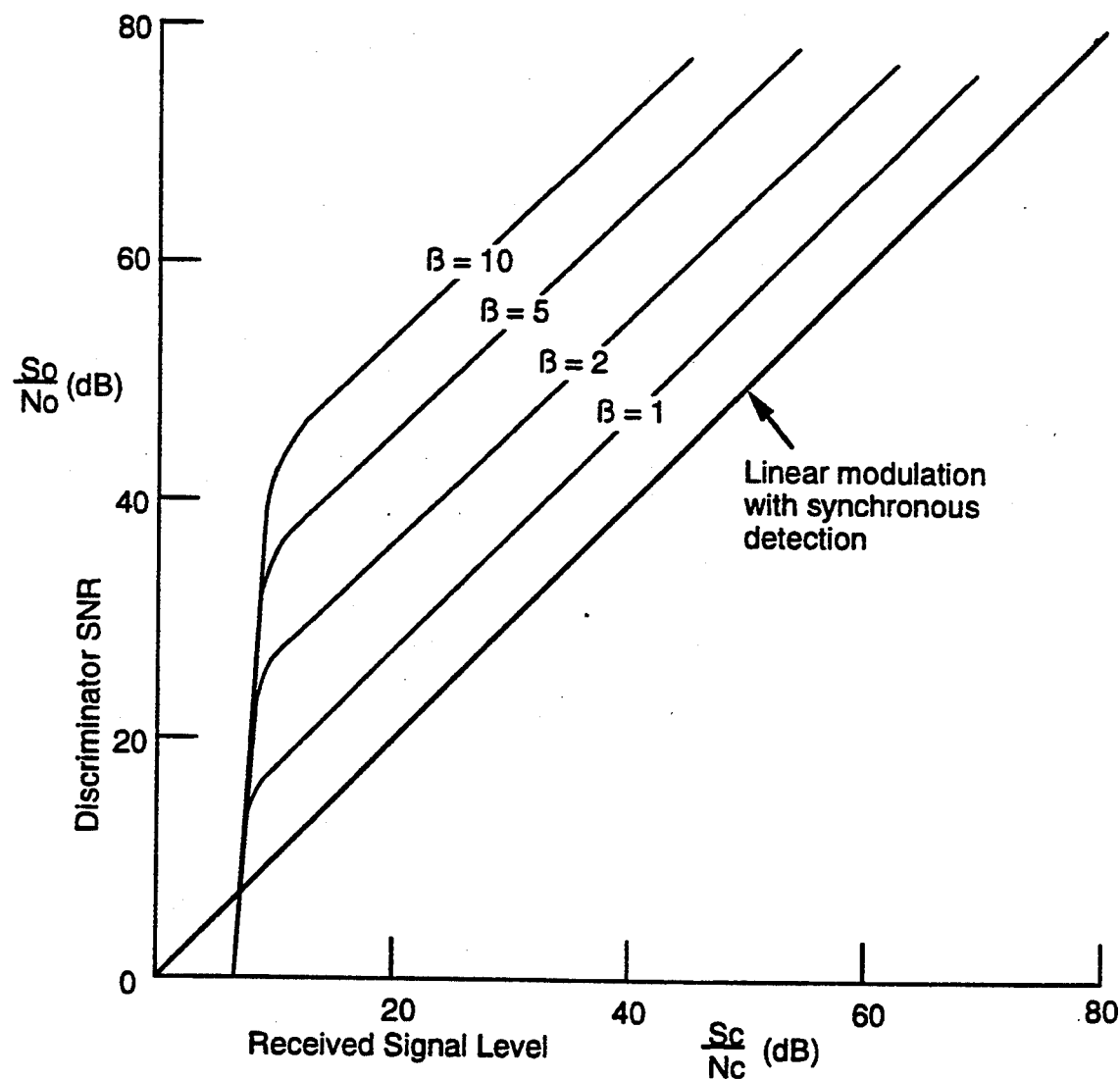
FIG. 2 is a graph showing how transmitter deviation influences the relationship between the received signal level SNR and the discriminator output SNR.
Figure 3:
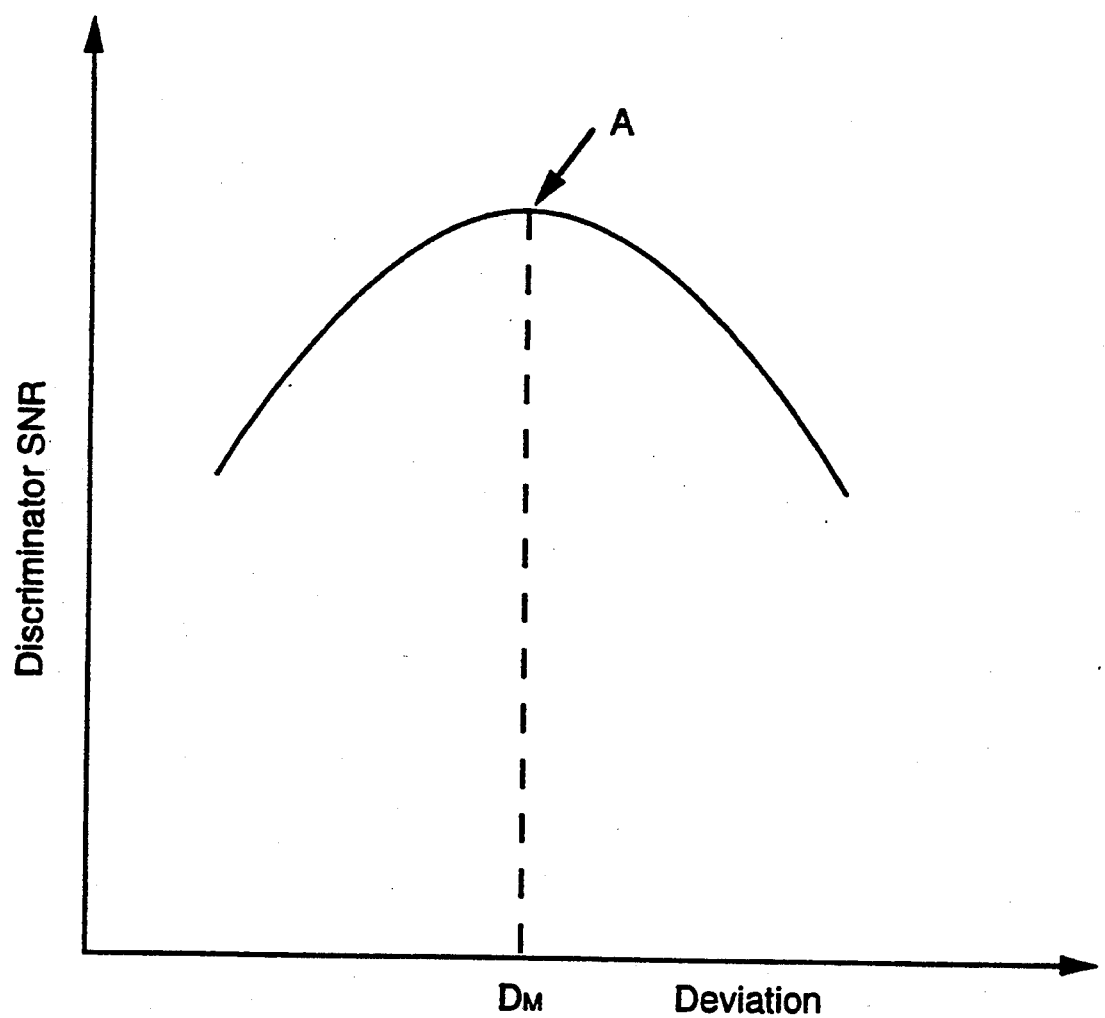
FIG. 3 shows a generalized curve of discriminator SNR on the vertical axis as a function of deviation on the horizontal axis. This curve shows that, in general, as transmitter deviation increases, the discriminator signal to noise ratio also increases until it peaks at a deviation value of $D_M$. For values of the deviation which are greater than $D_M$, system non-linearities cause the discriminator signal to noise ratio to decrease. This Figure suggests an optimum operating point ("A") at a deviation of $D_M$.
Figure 4:
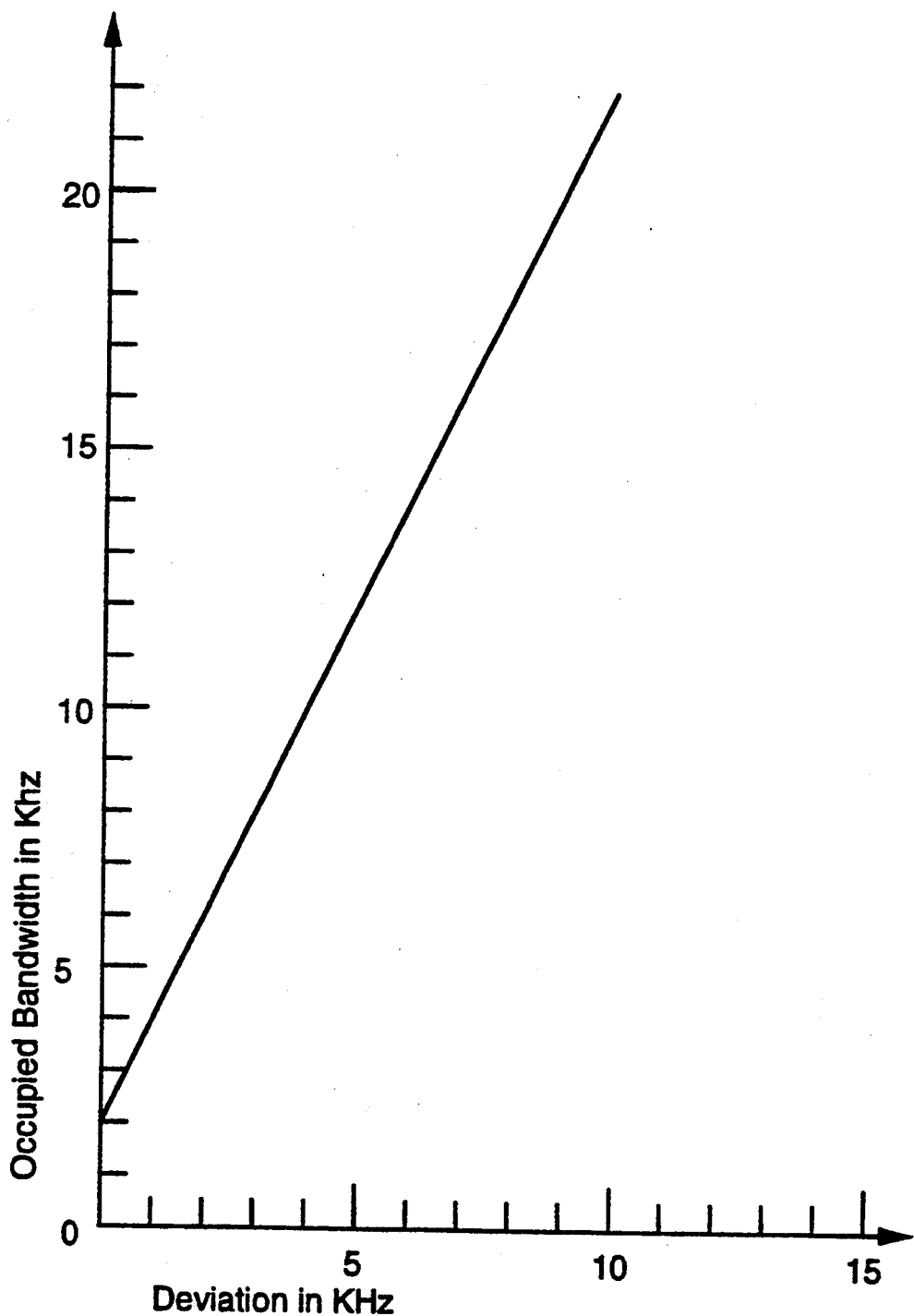
FIG. 4 shows a plot of occupied bandwidth on the vertical axis and deviation on the horizontal axis for a 1 kHz tone. This curve shows that occupied bandwidth increases with increasing transmitter deviation. This figure suggests that license terms may place a legal limitation on transmitter deviation.

Deviation plays an important role in determining the performance characteristics of any FM communications system. FIG. 2 illustrates a typical performance characteristic for an FM system called a quieting curve. The signal-to-noise ratio at the output of the receiver discriminator, plotted on the vertical axis, is shown as a function of the signal-to-noise ratio of the received signal, plotted on the horizontal axis. This relationship is shown for several values of a parameter $\beta$, which is proportional to the deviation of the transmitted signal, $\Delta f_{ts}$, and inversely proportional to the modulating frequency, $f_{mod}$, i.e., $\beta = \Delta f_{ts}/f_{mod}$. For example, at a constant modulating frequency, the curve labeled "$\beta = 1$" represents a smaller deviation value than the curve labeled "$\beta = 10$". FIG. 2 shows that when the transmission path is corrupted by noise, the signal-to-noise ratio, SNR, at the discriminator can be increased in two ways. First, for a fixed deviation value, increasing the SNR of the signal which is input to the discriminator produces increases in the discriminator SNR. Second, at a fixed value of the SNR of the received signal, increasing the deviation of the transmitted signal also produces increases in the discriminator SNR. This second relationship between discriminator SNR and deviation is also illustrated in FIG. 3, which shows a plot of the discriminator SNR on the vertical axis as a function of deviation on the horizontal axis. This figure also illustrates that there is a maximum point, A, to which the discriminator SNR can be increased by increasing the deviation. This occurs at the deviation value labeled $D_M$ on FIG. 3. For values of the deviation greater than $D_M$, system non-linearities reduce the discriminator signal to noise ratio. Thus, optimum performance of an FM system is achieved when the deviation is high enough to produce a good discriminator signal to noise ratio, but not high enough to the allow the system to become non-linear. Additionally, as shown in FIG. 4, the occupied bandwidth also increases as the deviation increases, leading to the possibility of interference with an adjacent radio channel. Since the license for an FM transmitter station limits the bandwidth within which the transmitter is permitted to operate in order to minimize such cross channel interference, excessive deviation could lead to violation of the license.

Figure 6:
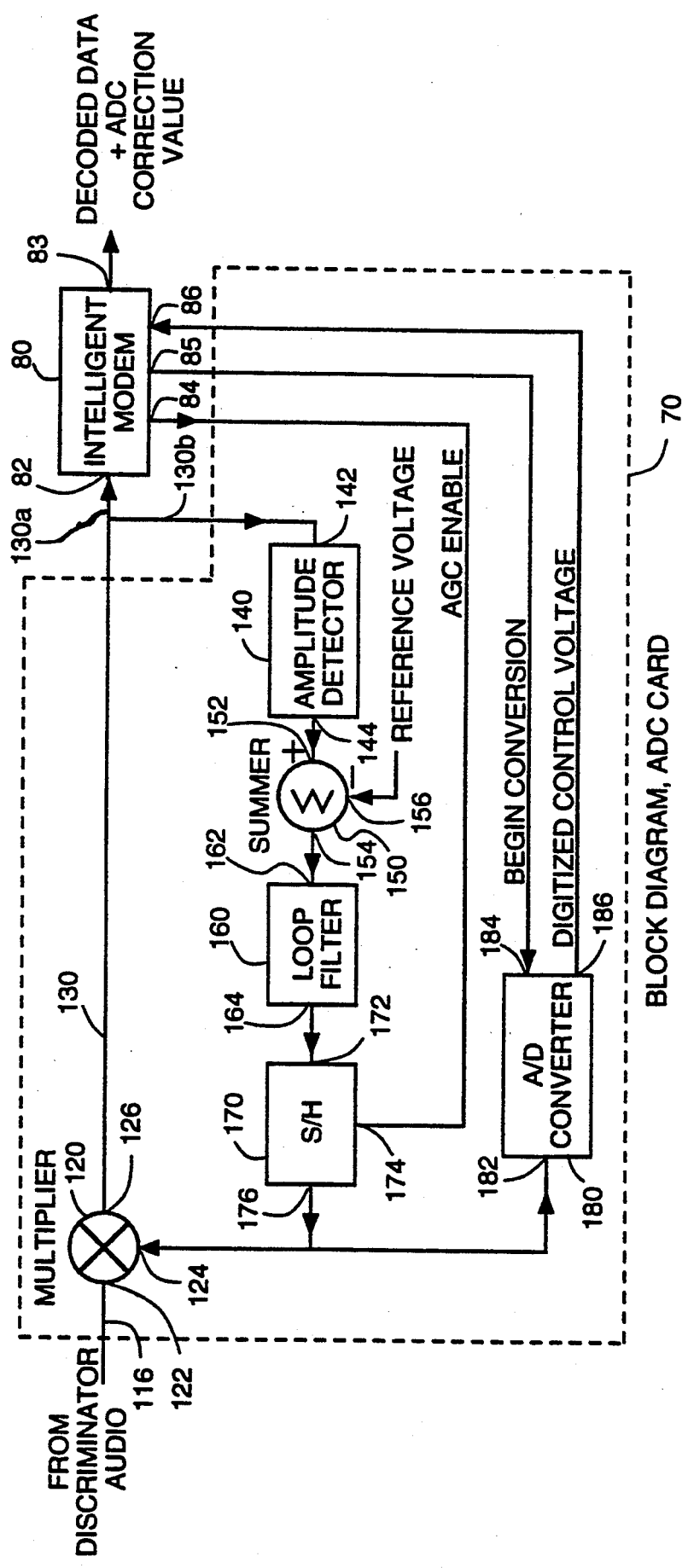
FIG. 6 is a detailed block diagram of the automatic deviation control circuit.

A detailed block diagram of the automatic deviation control circuit 70 is shown in FIG. 6. The automatic deviation control circuit 70 comprises a multiplier 120 having an input connection 122, output connection 126 and control voltage input connection 124. The multiplier output connection 126 is connected via a line 130 to the input connection 82 of intelligent deviation modem 80 and to an input connection 142 of an amplitude detector 140. An output connection 144 of amplitude detector 140 is connected to a plus input connection 152 of a summer 150. A minus input connection of the summer 150 is connected to a reference voltage source. An output connection 154 of the summer 150 is connected to an input connection 162 of a loop filter 160. An output connection 164 of the loop filter 160 is connected to an input connection 172 of a sample-and-hold circuit 170. An enable input connection 174 of the sample-and-hold 170 is connected to an automatic gain control (hereinafter "AGC") enable output connection 84 of the intelligent deviation modem 80. An output connection 176 of the sample-and-hold 170 is connected to the control voltage input connection 124 of the multiplier 120 and to an input connection 182 of an analog-to-digital convertor 180. A start conversion input connection 184 of the analog to digital convertor 180 is connected to a begin conversion control output connection of the intelligent deviation modem 80. A digitized control voltage output 186 of the analog to digital convertor 180 is connected to a control voltage input connection 86 of the intelligent deviation modem 80.

Figure 7:
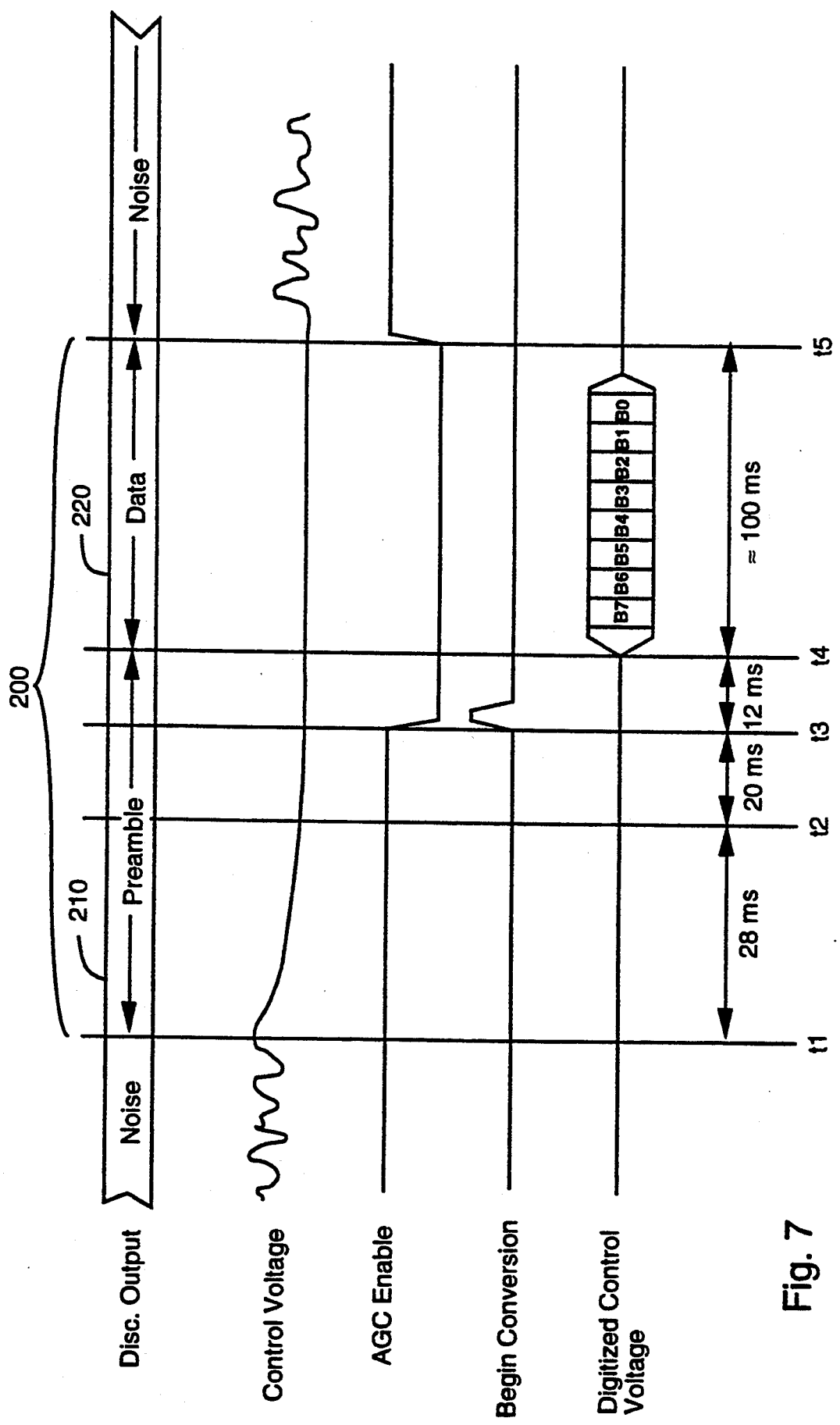
FIG. 7 is a signal timing diagram.

Operation of the invention is described in reference to the timing diagram shown in FIG. 7. The mobile data terminal 50 (FIGS. 1 and 5) assembles a digital data message comprising a preamble portion having a duration of approximately 60 milliseconds (mS) followed by a data portion. The preamble portion comprises a deterministic signal, for example, a series of all "ones", all "zeros", or any other predetermined series of ones and zeros. The data portion of the message typically appears as a random series of ones and zeros depending upon the particular message being sent. The digital data message is sent to the mobile modem 40 where it is converted from an electronic digital signal into an audio waveform 200, see FIG. 7, which contains the same information as the digital data message. The audio waveform 200 comprises a corresponding predeterministic preamble portion 210 and a corresponding data portion 220. For example, the preamble portion may be a sinusoidal signal whereas the data portion may appear purely random. After transmission of the audio waveform from the mobile unit 10 to the base station 20 via the voltage controlled oscillator 34 and discriminator 64, the audio waveform 200 is sent to the automatic deviation control circuit 70.

Solely for the purpose of simplifying the explanation of the operation of the invention and in no way limiting the scope of the invention, assume that the preamble portion 200 comprises a 2400 Hz sine wave and that a mobile unit which is operating flawlessly, i.e., transmits with theoretically ideal frequency deviation, transmits the 2400 Hz signal to the base station 20. Further assume that, after reception by the base station transceiver 60, the output of the discriminator 64, produces a 2400 Hz sine wave with a peak to peak voltage of 2 volts. Thus, if the frequency deviation of the mobile unit is not theoretically perfect, the peak to peak output voltage at the discriminator 64 will be less than or greater than 2 volts in response to the 2400 Hz sine wave. This information is then used to correct to incoming signal so that it does have a peak to peak voltage of 2 volts. Furthermore, the amount of the correction required is recorded so that the unit sending the data can be recalled and repaired to correct the improper deviation setting.

The correction of the peak to peak height of the incoming signal is performed by the multiplier 120, which operates as a variable gain element. It multiples the message signal from the discriminator by the control value received at input 124. For example, if the control value is 1, the input and output signals of the multiplier 120 are equal, i.e., the input and output signals have the same peak to peak voltage. Other values of the control signal can be applied which either increase of decrease the peak to peak output voltage relative to the input. The corrected message signal then goes to the amplitude detector 140 and the intelligent deviation modem 80. The amplitude detector 140 measures the peak to peak voltage of the message signal output by the multiplier and outputs a peak amplitude voltage signal which is an indication of the peak to peak value of the input signal. The time constant of the amplitude detector is somewhat dependent on the composition of the input signal. If the input signal is random, i.e., corresponding to the data portion of the message signal, the time constant varies and the output of the amplitude detector is unpredictable. However, if the input signal is sinusoidal and consequently deterministic as is the preamble portion 210, then the time constant is fixed. The time constant for the amplitude detector with a sinusoidal input is approximately 3.1 mS. The summer 150 receives the peak amplitude voltage from the amplitude detector at the plus input connection 152. The summer 150 also receives a peak amplitude reference signal at the minus input connection 156. The peak amplitude reference voltage represents the peak amplitude of a message signal transmitted with a theoretically ideal frequency deviation. The summer subtracts the peak amplitude reference voltage from the measured peak amplitude voltage and outputs a signal indicative of the difference on output 154. The difference output from the summer is an indication of the instantaneous frequency deviation error of the transmitter.

The instantaneous frequency deviation error from the summer is input to loop filter input connection 162. The loop filter 160 low-pass filters, i.e., averages, the instantaneous frequency deviation error and outputs an averaged frequency deviation error which is used as the control voltage for the automatic deviation control circuit loop.

The averaged frequency deviation error signal is supplied to the multiplier control input connection 124. The multiplier control input connection 124 receives a signal which is derived from the integral, with respect to time, of the instantaneous error signal. When the instantaneous error signal is zero, the integrated signal holds at a constant value which results in the zero instantaneous error signal. However, if the instantaneous error signal is not zero, the integrated signal changes until the instantaneous error signal is zero, thereby causing the integrated signal to converge toward the constant value.

The above described automatic gain control (AGC) loop, comprising multiplier 120, amplitude detector 140, summer 150 and loop filter 160, is a second order feedback loop as described by Dorf in *R.C. Modern Control Systems*, published by Addison Wesley, 1980, Chapter 4, hereby incorporated herein by reference. Preferably, the AGC loop is configured during installation such that a signal level corresponding to 4 kHz causes the loop to be critically damped with a settling time of approximately 25 mS.

The sample and hold 170, analog to digital convertor 180 and intelligent deviation modem 80 operate in conjunction with the above described AGC loop to provide automatic deviation compensation. In operation, the intelligent deviation modem 80 enables the AGC loop during the sinusoidal preamble portion 210 of the data message 200 and places the AGC loop in a hold mode during the non-deterministic data portion 220 of the message. The sample and hold 170 enables and disables the AGC loop under control of the AGC enable signal received from the intelligent deviation modem output connection 84. As shown in FIG. 7, the AGC enable signal is always on, except for the time period of approximately 12 mS prior to the arrival of the data portion 220 of the message 200 and during the time the data portion 220 is present. This time period is shown as occurring from time $t_3$ through $t_5$. When the AGC is enabled, the sample and hold 170 passes the averaged frequency deviation error signal from the loop filter 160 to the multiplier 120, and the AGC feedback loop is operational, i.e. closed. When the AGC enable line disables the AGC loop, the sample and hold output is fixed at the value it had when the AGC enable was turned off. The analog to digital convertor then converts the analog value of the averaged frequency deviation error signal output of the sample and hold to a digital value. Conversion is initiated by a begin conversion input signal received from the intelligent deviation modem output connection 85. The digitized value of the averaged frequency deviation error is passed to the intelligent deviation modem via the input connection 86.

As described above, the intelligent deviation modem 80 performs several functions. It senses the preamble portion 210 of the data message 200, turns the AGC loop on and off, receives and decodes the data burst 220, and reads the AGC loop's digitized averaged frequency deviation error. The modem also passes the decoded data and averaged frequency deviation error to the telephone line modem 90.

In a typical transmission of data from a mobile unit 10 to the base station 20, transmission is initiated by the data terminal 50 in the vehicle. Data from the mobile terminal is received by the mobile modem 40, and the mobile modem waits for any other traffic on the channel to clear. When the channel is clear, the mobile modem causes the radio to key or emit an RF signal. The modem 40 then outputs approximately 60 mS of sinusoidal tone, i.e., the data signal preamble, which is frequency modulated by the VCO 34 in the transceiver 30. The mobile modem then converts the data from the terminal to an audio waveform 220 and appends the preamble 210, thus creating signal 200 which is frequency modulated by the VCO 34 in the transceiver 30.

The frequency modulated signal is received by the base station transceiver 60, and the discriminator 64 output is connected directly to the automatic deviation control circuit 70. The automatic deviation control circuit 70 is presented with the data burst 200 as shown in FIG. 7. Prior to time $t_1$, i.e., before the mobile transceiver 30 begins transmitting, the channel is idle and the AGC portion of the automatic deviation control circuit 70 receives noise from the discriminator 64. Since it is receiving noise, its operation is unpredictable. However, at time $t_1$, the discriminator output changes from noise to the predetermined sinusoidal preamble 210. When presented with this preamble, the AGC loop responds by adjusting the control voltage applied to the multiplier connection 124 such that the peak to peak voltage of the corrected sinusoidal preamble signal at the output connection 126 of multiplier 120 equals a pre-determined value. At time $t_2$, the AGC loop has settled. Typically, the time interval between $t_1$ and $t_2$ is approximately 28 mS.

The deviation of the incoming signal is related to the control voltage by the following relationship:

$$dev = k_z/V_c \quad (3)$$

where:
dev is the AGC's deviation estimate;
$k_3$ is a proportionality constant; and
$V_c$ is the control voltage at the multiplier input.

At time $t_2$, the output of the AGC loop has determined the correction factor necessary to correct for deviation errors in the mobile transceiver and has corrected the signal being input to the intelligent deviation modem 80. At time $t_2$, the intelligent deviation modem 80 phase locks to the incoming sinusoid. Immediately after time $t_3$, which occurs 20 mS after the modem phase locks to the incoming sinusoid, the intelligent deviation modem 80 switches the AGC enable line 84 to cause the sample and hold circuit 170 to hold the correction value which was established for this sinusoid. Also at time $t_3$, the intelligent deviation modem 80 asserts the begin conversion signal on connection 85 causing the analog to digital converter to digitize the correction value held in the sample and hold and send it to the intelligent deviation modem 80 input connection 86.

At time $t_4$, the signal from the discriminator changes from the preamble portion 210 to data portion 220. Note that during the data portion, the correction value is held fixed by the sample and hold circuit in response to deassertion of the AGC enable signal. Even though the deviation of the incoming signal may not be correct, the AGC loop has corrected its amplitude so that if the incoming signal to noise ratio is sufficiently high, the signal can be decoded by the intelligent deviation modem 80.

At time $t_5$, the data portion 220 ends, the AGC enable signal is once again asserted, and the AGC loop is again activated. The loop is now in the same state as it was prior to receiving the incoming data message 200. The loop is now prepared for the arrival of the next data message.

After the data portion of the waveform has been decoded by the intelligent deviation modem 80 base, the data and deviation estimate are combined into a data packet and sent to the telephone line modem 90 which passes the signal to the dispatch computer 110.

The dispatch computer system routes the data message appropriately. The deviation estimate is entered in a historical data base which is periodically reviewed by service personnel. From the data base, one can inquire about the deviation of any vehicle. The data base returns the deviation of the last ten messages received from that vehicle and also the average deviation over the last 100 messages. The data base can also return a sorted list of the most poorly improperly adjusted mobile units. Based on the inquiry, radio service personnel can be dispatched to correct improperly adjusted vehicles.

It will be understood that the apparatus and method of the present invention for intelligent automatic deviation compensation for wireless modems may be employed with many types of wireless modems and feedback loops in addition to those disclosed herein. Thus, there are numerous other embodiments of the intelligent automatic deviation compensation for wireless modems invention which will be obvious to one skilled in the art, including but not limited to changes in the specific characteristics of the data preamble, the feedback loop, the frequency modulation transceivers and the wireless modems. The apparatus and method of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An automatic frequency deviation monitoring system comprising:
a remote station communications system, said remote station communications system further comprising:

a remote data processor which generates a data signal having a preamble portion and a data portion;

a remote modem which is connected to said remote data processor, wherein said remote modem receives said data signal from said remote data processor and generates a corresponding modulated data signal; and a frequency modulated (FM) transmitter which is connected to said remote modem, wherein said FM transmitter receives said modulated data signal from said remote modem and generates a corresponding FM data signal having a frequency deviation value which is characteristic of said FM transmitter;

and a base station communications system, said base station communications system further comprising:

an FM receiver which receives said FM data signal from said remote station communications system and generates a corresponding audio data signal;

a frequency deviation monitoring feedback loop connected to receive said audio data signal from said FM receiver, said frequency deviation monitoring feedback loop further comprising:

an amplitude detector for measuring the amplitude of said preamble portion of said audio data signal;

a comparator for comparing said measured amplitude of said preamble portion of said audio data signal to a reference value and generating a frequency deviation correction factor which reflects differences between said measured amplitude and said reference value; and a variable gain element which uses said deviation correction factor to adjust the amplitude of said audio data signal until said measured amplitude of said preamble portion of said audio data signal is substantially equal to said reference value;

and a base modem, wherein said base modem comprises a controller which is configured to: (a) sense the presence of said preamble portion of said audio data signal and enable said frequency deviation monitoring feedback loop when the presence of said preamble portion of said audio data signal is initially sensed; (b) control the digitization and storage of said frequency deviation correction factor which causes said adjusted amplitude of said preamble portion of said audio data signal to be substantially equal to said reference value; and (c) append said digitized frequency deviation correction factor to said audio data signal.

2. A frequency deviation monitor comprising:

an automatic gain control circuit, said automatic gain control circuit further comprising:

a variable gain element means having a signal input, a signal output and a gain control input, wherein: (a) said signal input receives an input signal having a first portion and a second portion, said input signal further characterized by an input frequency deviation value, said first portion characterized by a first peak to peak amplitude which is a function of said input frequency deviation value; (b) said gain control input receives a gain factor; and (c) said signal output delivers a frequency deviation corrected output signal characterized by a second peak to peak amplitude of said first portion of said signal which is a function of said first peak to peak amplitude and said gain factor;

an amplitude detector means connected to said variable gain element means signal output for measuring said second peak to peak amplitude;

a comparison element means connected to said amplitude detector means for receiving said second peak to peak amplitude and for comparing said second peak to peak amplitude to a reference value, said comparison element means having an output indicative of the real time difference between said second peak to peak amplitude and said reference value;

a signal averager means connected to said comparison element means output for receiving said real time difference between said second peak to peak amplitude and reference value and for producing a frequency deviation correction factor which is proportional to the time average of said real time difference; and a storage element means connected to said signal averager means for receiving and holding said frequency deviation correction factor, wherein said storage element means makes said frequency deviation correction factor available to said variable gain element means gain control input and to an analog to digital converter;

and a modem means connected to said automatic gain control circuit for receiving said frequency deviation corrected output signal from said variable gain element means signal output and for decoding said frequency deviation corrected output signal and controlling the operation of said automatic gain control circuit wherein said modem means: (a) enables said automatic gain control circuit only when it detects the presence of said first portion of said input signal; (b) sends a begin conversion command to said analog to digital convertor causing it to digitize said frequency deviation correction factor; (c) decodes said frequency deviation corrected output signal to create a decoded message; and (d) appends said frequency deviation correction factor held by said storage element means to said decoded message.

3. A frequency deviation monitor comprising:

an input connection for receiving a frequency modulated (FM) signal, wherein a portion of said frequency modulated (FM) signal is deterministic in character;

a discriminator which receives said FM signal and converts said FM signal into a corresponding audio waveform signal;

an automatic gain control feedback loop which receives said audio waveform signal and generates a frequency deviation correction factor for said FM signal by comparing the amplitude of said deterministic portion of said corresponding audio waveform signal to a reference standard, said automatic gain control feedback loop further having means to generate a frequency deviation corrected output signal by applying said frequency deviation correction factor to said audio waveform signal which corresponds to said FM signal; and a modem for receiving said frequency deviation corrected output signal from said automatic gain control feedback loop and decoding said frequency deviation corrected output signal and controlling said automatic gain control feedback loop wherein said modem: (a) enables said automatic gain control feedback loop when it detects the presence of said deterministic portion of said audio waveform signal; (b) sends a begin conversion command to an analog to digital convertor causing it to digitize said frequency deviation correction factor; (c) decodes said frequency deviation corrected output signal to create a decoded message; and (d) appends said frequency deviation correction factor to said decoded message.

4. A frequency deviation monitor as defined in claim 3 wherein said automatic gain control feedback loop further comprises a variable gain element having a signal input connected to said discriminator for receiving said audio waveform signal, a signal output and a gain control input, wherein: (a) said signal input receives said audio waveform signal and said deterministic portion of said signal is characterized by a first peak to peak amplitude; (b) said gain control input receives said frequency deviation correction factor; and (c) said signal output delivers said frequency deviation corrected output signal characterized by a second peak to peak amplitude which is a function of said first peak to peak amplitude and said gain factor to said modem.

5. A frequency deviation monitor as defined in claim 4 further comprising an amplitude detector for measuring said second peak to peak amplitude of said frequency deviation corrected output signal.

6. A frequency deviation monitor as defined in claim 5 further comprising a comparison element for comparing said second peak to peak amplitude of said frequency deviation corrected output signal to a reference value, said comparison element having an output indicative of the real time difference between said second peak to peak amplitude and said reference value.

7. A frequency deviation monitor as defined in claim 6 further comprising a signal averager for producing said frequency deviation correction factor which is the time average of said real time difference.

8. A frequency deviation monitor as defined in claim 7 further comprising a storage element for holding said frequency deviation correction factor, wherein said storage element makes said frequency deviation correction factor available to said variable gain element gain control input and to said analog to digital converter.

9. A method for monitoring frequency deviation comprising the steps of:

receiving a frequency modulated (FM) signal having a preamble of known characteristics followed by a data message;

converting said FM signal to a corresponding audio waveform signal;

measuring the peak to peak amplitude of said preamble of said audio waveform signal;

processing said audio waveform signal in a feedback loop by adjusting the gain of a variable gain element in said loop until the peak to peak amplitude of said preamble is substantially equal to a reference value;

storing the value of the gain which causes said peak to peak amplitude of said preamble to be substantially equal to said reference value as a frequency deviation correction factor;

sending said processed audio waveform signal wherein the peak to peak amplitude of said preamble is substantially equal to said reference value to a modem; and appending said frequency deviation correction factor to said data message.

10. A method for monitoring frequency deviation as defined in claim 9 further comprising the step of transmitting said data message to a data processor.

11. A method for monitoring frequency deviation as defined in claim 10 further comprising the step of maintaining a historical log of said frequency deviation correction factors for data messages received by said data processor.

* * * * *